Sept. 20, 1927.
C. P. WETMORE
1,643,263
TAPPING TOOL
Filed Oct. 20, 1923
3 Sheets-Sheet 1
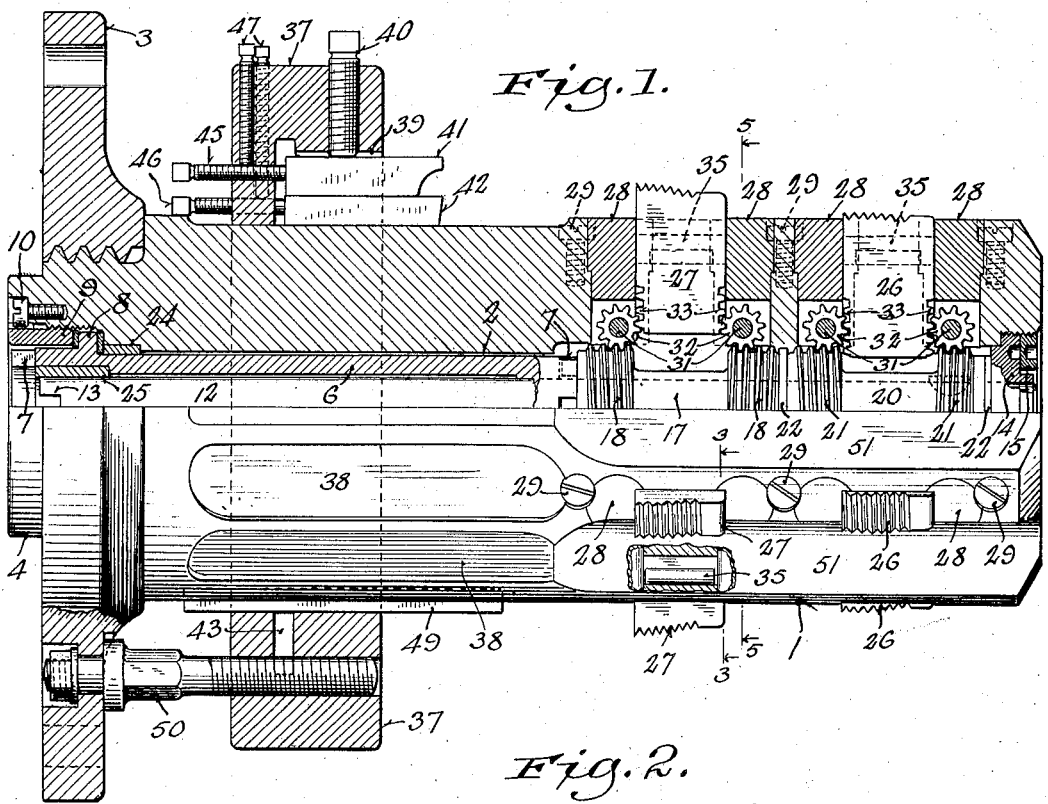
Fig. 1.
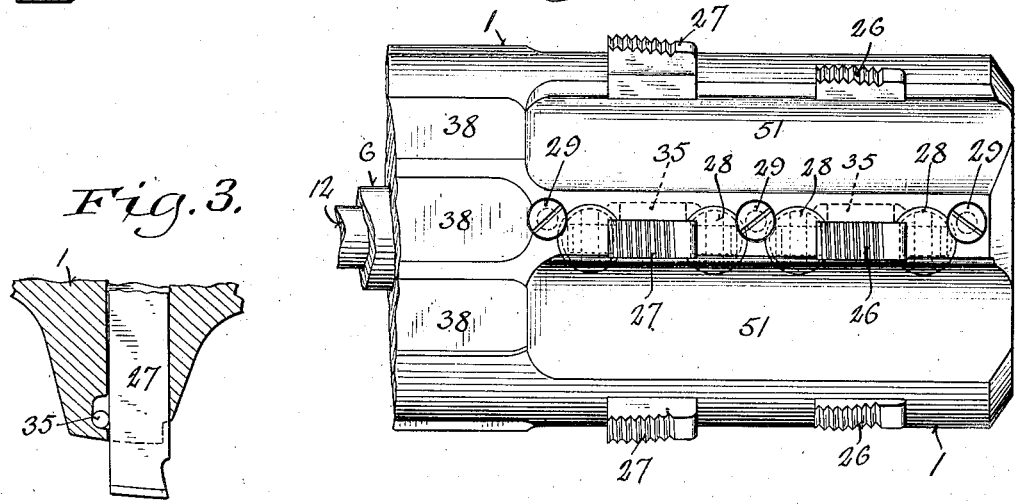
Fig. 2.
Fig. 3.
INVENTOR:
Charles P. Wetmore,
BY
Bothun, Hudnall, Lecher McNamara,
ATTORNEYS.

Sept. 20, 1927.

C. P. WETMORE 1,643,263

TAPPING TOOL

Filed Oct. 20, 1923

3 Sheets-Sheet 2

INVENTOR:
Charles P. Wetmore,
BY
Bottum, Hudnall, Lecher & McNamara,
ATTORNEYS.

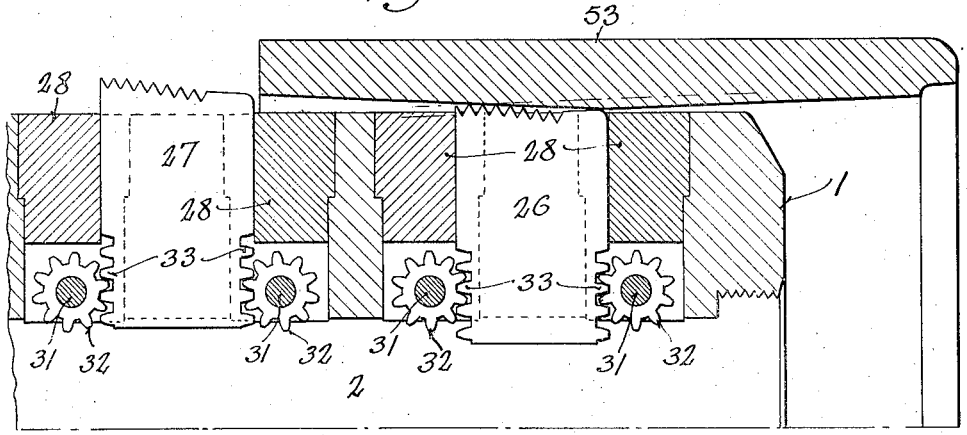
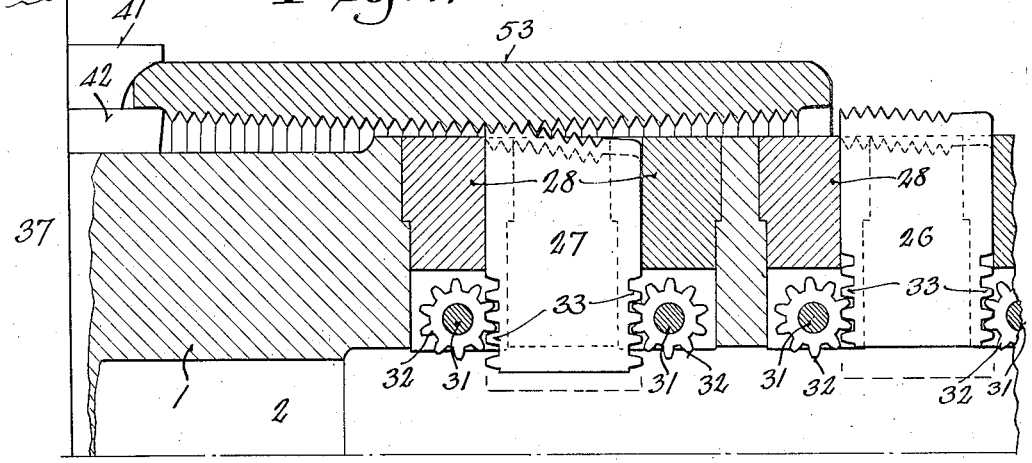
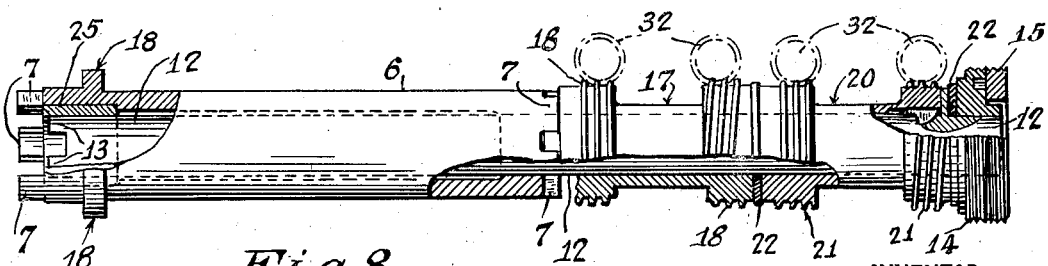

Patented Sept. 20, 1927.

1,643,263

UNITED STATES PATENT OFFICE.

CHARLES P. WETMORE, OF MILWAUKEE, WISCONSIN, ASSIGNOR, BY MESNE ASSIGNMENTS, TO A. O. SMITH CORPORATION, OF MILWAUKEE, WISCONSIN, A CORPORATION OF NEW YORK.

TAPPING TOOL.

Application filed October 20, 1923. Serial No. 669,704.

This invention relates more particularly to expansible and contractible tapping tools having radially or outwardly and inwardly movable chasers for internally threading pipe couplings, unions or fittings and other articles having straight cylindrical, tapered or partly cylindrical and partly tapered bores.

The main objects of the invention are in a single operation by movement of the tool or work in one direction to tap pipe couplings or fittings and other articles with cylindrical, tapered, double or reversely tapered or partly cylindrical and partly tapered bores; to positively shift the radially movable chasers or thread cutters both outward and inward; to shift the chasers radially inward into inoperative position clear of the thread cut thereby in a coupling, fitting or other article to permit the withdrawal axially of the tool therefrom or vice versa; and generally to improve the construction and operation of tapping tools of this class and to facilitate threading pipe couplings or fittings and other articles having straight or tapered bores.

It consists in the construction, arrangement and combination of parts as hereinafter particularly described and pointed out in the claims.

In the accompanying drawing like characters designate the same parts in the several figures.

Figure 4:
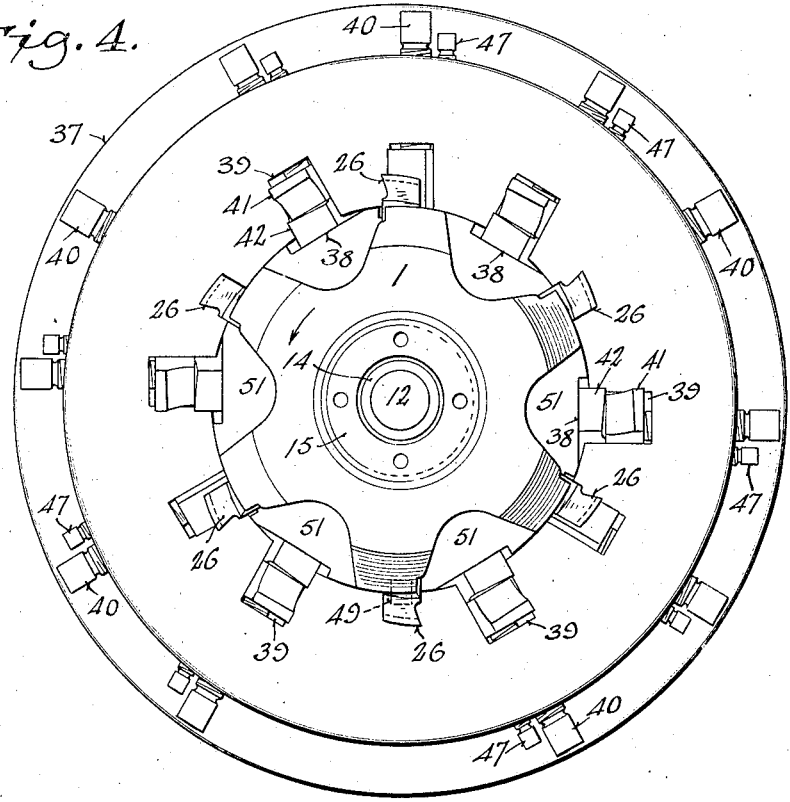
Figure 5:
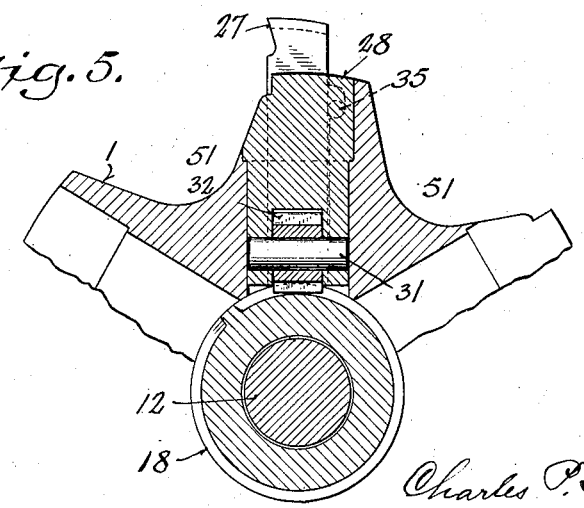

Figure 1 is a half central longitudinal section and half side elevation with parts broken away, of a tapping tool embodying the invention; Fig. 2 is an elevation in a plane at right angles to that of Fig. 1, of a portion of the tool; Fig. 3 is an enlarged partial cross section on the line 3—3, Fig. 1; Fig. 4 is an end elevation of the tool as viewed from the right relative to Fig. 1; Fig. 5 is a partial enlarged cross section of the tool on the line 5—5, Fig. 1; Fig. 6 is an enlarged longitudinal section of part of the tool and of a pipe coupling, the tool and pipe coupling being in position to begin threading the coupling; and Fig. 7 is a similar section showing the tool and coupling at the end of the threading operation, the retracted positions of the chasers for withdrawal of the tool axially from the threaded coupling or vice versa, being indicated by dotted lines. Fig. 8 is a view in side elevation, partly in longitudinal section, showing the arrangement of one shaft within the other, and the worms mounted upon the respective shafts, together with other certain details of construction.

The tool comprises a head 1, of approximately cylindrical shape formed with a central longitudinal or axial bore 2, and with radial openings into an enlargement of the bore adjacent the free or unsupported end of the head. At its opposite end the head is provided with an outwardly projecting ring or flange 3, with which it is preferably detachably connected, as by coarse screwthreads, as shown in Fig. 1, and by which it is fastened to a drill press or other machine tool equipped with the requisite change-speed and reversing gearing for imparting the desired movements to the thread cutting blades or chasers of the tool.

The drill press or other machine tool with which the tapping tool is to be used, will also be provided with a suitable chuck for holding pipe couplings or other articles to be threaded by the tapping tool.

Both rotary and axial movements required for the threading operations may be imparted either to the tapping tool or to the chuck in which the work is held, or the tapping tool may be rotated and the work holding chuck shifted axially or vice versa.

If the tapping tool is to be stationarily supported while the work holder or chuck is rotated and shifted axially relative to the tapping tool, the head 1 will be fastened by the ring or flange 3 to the frame or a stationary part of the drill press or other machine tool. On the other hand, if the tapping tool is to be rotated with or without axial movement thereof, the head 1 will be fastened by the ring or flange 3 to the rotary tool spindle of the drill press or other machine tool.

At the end adjacent the ring or flange 3, the head 1 is preferably formed with a projecting circular boss 4, for centering it with relation to its supporting and driving connections with the drill press or machine tool, and for relieving from shearing strain the bolts by which the ring or flange is fastened to the frame or tool spindle of the drill press or other machine.

A tubular chaser actuating shaft 6, is mounted in the supported end of the head 1, coaxially therewith, and is formed at the ends with clutch teeth 7, and adjacent its rear end with a thrust collar 8. The collar 8 is confined in a short counterbore of the head 1, between the inner end of the counterbore and an adjustable sleeve or thrust collar 9 threaded therein, wear washers of bronze or other suitable material being interposed between the sides of the collar 8, the end of the counterbore in the head and the inner end of the sleeve 9. The sleeve is locked in adjusted position by a screw 10, threaded in the head 1 with its countersunk screw head in engagement with one of a series of notches formed in the periphery of the sleeve adjacent its outer end.

An independently rotatable chaser actuating shaft 12 is mounted in and extends through the tubular shaft 6, and is provided at the end adjacent the fixed or supported end of the head 1, with clutch teeth 13, and at the opposite end with a bearing in a ring or collar 14, which is threaded in a short counterbore in the outer or free end of the tapping head 1 and secured in place therein by an annular lock nut 15.

The shafts 6 and 12 are connected by suitable gearing, as shown in Figs. 1 and 5 and hereinafter described for example, with the thread cutting blades or chasers, for imparting the required adjustments or movement thereto.

A sleeve 17, formed or provided with worms 18, is fitted and mounted for rotation upon the shaft 12, and is provided at one end with clutch teeth engaging the clutch teeth 7 on the adjacent end of the tubular shaft 6. A similar sleeve 20, formed or provided with worms 21, is fitted and mounted on the shaft 12 between the sleeve 17 and the ring or collar 14, and is keyed as indicated by dotted lines in Fig. 1, or otherwise fastened on said shaft so as to rotate therewith. Bronze or other suitable wear washers 22, are interposed between adjacent ends of the sleeves 17 and 20 and between the sleeve 20 and the ring or collar 14.

The tubular shaft 6 is supported adjacent the collar 8 by a bushing 24, fitted in a counterbore of the head 1, and the shaft 12 is supported at its adjacent end by a bushing 25, fitted in a counterbore in the tubular shaft.

The shaft 12 has a bearing also in the front end of the tubular shaft 6, besides its bearing in the ring or collar 14, and the toothed peripheries of the worms 18 and 21 are accurately fitted and supported in the enlargement of the bore 2 in the head 1, so that said shafts and worms are firmly supported in the tapping head 1 coaxially therewith and with one another.

Radially movable thread cutting blades or chasers 26 and 27, are fitted and guided in the radial openings of the head 1, which are elongated lengthwise of the head and intersect at their ends shouldered cylindrical enlargements. In such enlargements are removably fitted shouldered cylindrical plugs or pinion blocks 28, which are held in place by cap screws 29, threaded radially in the tapping head and having their heads countersunk in the tapping head 1 and in the plugs or blocks, as shown in Figs. 1 and 2. The chaser openings, which are of rectangular shape include at their ends channels formed in the plugs or blocks 28, which latter are forked at their inner ends and in which are journaled on cross pins 31, pinions 32, in mesh with rack teeth 33 on opposite edges of the chasers. The pinions engaging the rack teeth of the leading chasers 26 are engaged by the worms 21, and the pinions engaging the rack teeth of the trailing chasers 27 are engaged by the worms 18.

To prevent binding of the chasers in their bearings in the head 1 and to facilitate their radial adjustments or movements in the head, rollers 35 are loosely confined in recesses formed in the back walls of the radial chaser openings in the head 1, from which they project slightly into engagement with the backs of the chasers adjacent the periphery of the head, as shown in Figs. 1, 2, 3 and 5.

As shown in Figs. 1 and 4, between the ring or flange 3 and the trailing chasers 27, a collar 37 is adjustably mounted on the tapping head 1, which is formed on its periphery adjacent the inner side of the collar with flat faces or seats 38. The collar 37 is formed with internal recesses or openings 39 through its face towards the chasers 27 and in these recesses or openings are fitted and clamped against the seats 38 by screws 40 threaded radially in the collar, end finishing or corner facing and counterboring cutters 41 and 42, which are preferably set, as shown in Fig. 4, at a slight oblique angle to the axis of the head 1 with their cutting ends in advance.

To facilitate forming the cutter recesses or openings 39, the collar 37 is formed with an internal annular groove or channel 43. The cutters 41 and 42 are adjusted lengthwise by screws 45 and 46 threaded in the collar 37 approximately parallel with the axis of the head 1 and bearing at their ends against the back ends of the cutters. The adjusting screws 45 and 46 are locked in place by screws 47 threaded radially in the collar 37.

The collar 37, which is splined by a key 49 on the head 1, as shown in Figs. 1 and 4, and is adjustable lengthwise of the head, is connected with the ring or flange 3 by a screw 50 swiveled in the ring or flange and threaded in the collar parallel with the axis of the head 1.

Adjacent and between the chasers 26 and 27 the head 1 is formed as shown in Figs. 2, 4 and 5, with deep longitudinal flutes or grooves 51, to receive and hold the chips produced by the chasers when the tapping tool is cutting an internal thread in a fitting such as a pipe coupling 53, as shown in Figs. 6 and 7.

In the operation of the tool for threading a pipe coupling or the like, the chaser actuating shafts 6 and 12 being connected with independently rotatable and reversible members of transmission gearing of a drill press or machine tool to which the tapping tool is applied, a fitting such as a pipe coupling 53, to be threaded, is placed and held in a chuck (not shown) in axial alignment with the tapping tool.

Assuming that the tapping tool is rotatable and movable axially while the work is held stationary in the chuck, the tool is advanced into the coupling 53, as shown in Fig. 6, in which the leading chasers 26 are shown in position for beginning to cut an outwardly tapering thread beginning a little in advance of the center of the coupling, and the trailing chasers 27 are shown in position for entering the end of the coupling in which an inwardly tapering thread is to be cut, the tapping tool being rotated and advanced at each revolution thereof a distance equal to the pitch of the thread to be cut. The leading chasers 26 are gradually moved outward, according to the enlarging taper of the bore to be threaded, by means of the gear connections of said chasers with the shaft 12. As the trailing chasers 27 enter the coupling they are gradually moved inward by their gear connections with the tubular shaft 6 and cut a taper thread of diminishing diameter. These movements follow the rotation of the shafts 6 and 12, actuating the worms 18 and 21 respectively, the latter engaging the pinions 32 which are in mesh with the teeth 33 formed upon the opposite edges of the chasers 35, the shafts 6 and 12 rotating in opposite direction. By disposing the chasers in the spaced radial order set forth the reactive pressures exerted equalize themselves, so that the shafts 6 and 12 are relieved from the lateral thrusts which otherwise would occur in case the reactive forces imposed upon the chasers were not so distributed. As a result, the frictional bearing of the said shafts in their lateral mountings is minimized, and the shafts are sustained in floating relation in their lateral bearings, which latter function more as guides for positioning the shafts.

At the end of the advance movement of the tapping tool the leading chasers 26 pass out of and clear the coupling 53 and the trailing chasers 27 finish the thread begun by the chasers 26 adjacent the center of the coupling, as shown in Fig. 7, the thread cut by the chasers 27 merging with the thread cut by the chasers 26, and a continuous thread of constant pitch being formed in the coupling from one end to the other. The worms 21 are then reversed and turned in the opposite direction, while the rotation of the worms 18 is continued in the same direction, thereby withdrawing the chasers 26 and 27 into the head 1, so as to clear the thread cut in the coupling or other fitting at the shortest diameter thereof and permit the withdrawal of the tapping tool axially from the threaded coupling.

Shortly before the limit of the advance movement of the tapping tool, the end finishing or corner facing and counterboring cutters 41 and 42 are carried into engagement with the adjacent end of the coupling 53 and form a smooth rounded end and a smooth counterbore of the desired extent in the coupling.

The other end of the coupling may be counterbored and have its corner rounded by any suitable finishing means.

If the coupling is held stationary in the chuck while the tapping tool is rotated and advanced, the end finishing cutters will be rotated and moved axially relative to the chuck, but if the chuck is rotated, these end finishing tools will not be rotatably mounted, and if the work with the chuck is both rotated and moved axially, the extra end finishing tools may be stationarily mounted.

Various changes in the details of construction and arrangement of parts of the tapping tool and of the connections for actuating or adjusting the chasers may be made to adapt the tool for application to different kinds of machines and for different kinds of work, so as to thread double or reversely tapered bores, partly cylindrical and partly tapered bores, or straight cylindrical bores, without departure from the principle and scope of the invention as defined in the following claims.

I claim:

1. In a tapping tool, the combination of a head having a central axial bore and radial openings into the bore, chasers guided for radial movement in said openings, a shaft rotatably mounted in the central bore of the head, and gearing connecting said shaft with the chasers to actuate the latter during operation of the tapping tool.

2. In a tapping tool, the combination of a head having an axial bore and radial openings into the bore, chasers guided for radial movement in said openings and provided on their edges with teeth, pinions mounted in the head in mesh with the teeth of the chasers, and a shaft rotatably mounted in the bore of the head and provided with worms engaging the pinions, to actuate the chasers during the operation of the tapping head.

3. In a tapping tool, the combination of a head having an axial bore and lateral openings into the bore, independently movable chasers guided in said openings, shafts rotatably mounted in the bore of the head, and gearing connecting the shafts with the chasers to actuate the latter during operation of the tapping tool.

4. In a tapping tool, the combination of a head having an axial bore and lateral openings into the bore, radially movable chasers guided in said openings and having rack teeth on opposite edges, pinions mounted within the head and meshing with the rack teeth of the chasers, and shafts rotatably mounted in the bore of the head coaxial therewith and with each other and provided with worms meshing with the pinions, to actuate the chasers during the operation of the tapping head.

5. In a tapping tool, the combination of a head having an axial bore and lateral openings into the bore, radially movable chasers guided in said openings and provided on opposite edges with rack teeth, pinion blocks removably fitted in the head at opposite ends of the chaser openings and provided with pinions meshing with the rack teeth of the chasers, and a rotatable shaft mounted in the bore of the head coaxial therewith and provided with worms meshing with the pinions.

6. In a tapping tool, the combination of a head having an axial bore and radial openings into the bore, radially movable chasers guided in said openings and provided on opposite edges with rack teeth, pinion blocks removably fitted in the head on opposite sides of the chasers and provided with pinions meshing with the chaser teeth, and independently and reversibly rotatable shafts mounted in the bore of the head coaxial therewith and with each other, and provided with worms meshing with the pinions.

7. In a tapping tool, the combination of a head having an axial bore and lateral openings into the bore, outwardly and inwardly movable chasers guided in said openings, a tubular shaft mounted in the bore of the head coaxial therewith and connected by gearing with one set of chasers, and an independently rotatable shaft mounted in and extending through the tubular shaft and connected by gearing with another set of chasers.

8. In a tapping tool, the combination of a head having an axial bore and lateral openings into the bore, radially movable chasers guided in said openings and having rack teeth on opposite edges, pinions mounted within the head on axes transverse to the axis of the head and meshing with the teeth of the chasers, a tubular shaft rotatably mounted in the bore of the head coaxial therewith and provided with worms meshing with the pinions of one set of chasers, and an independently rotatable shaft mounted in and extending through the tubular shaft coaxial therewith and provided with worms meshing with the pinions of another set of chasers.

9. In a tapping tool, the combination of a head having an axial bore and lateral openings into the bore, radially movable chasers guided in said openings and provided on opposite edges with rack teeth, pinions mounted within the head and meshing with the teeth of the chasers, a tubular shaft rotatably mounted in the bore of the head coaxial therewith and provided at the ends with clutch teeth, an indepedently rotatable shaft mounted in and extending through the tubular shaft and provided at one end with clutch teeth and at the other end with a bearing in the head, and sleeves mounted on the inner shaft and provided with worms meshing with the pinions, one sleeve having clutch teeth engaged with the clutch teeth on the adjacent end of the tubular shaft and the other sleeve being fastened on the inner shaft.

10. In a tapping tool, the combination of a head having an axial bore and lateral openings into the bore, radially movable chasers guided in said openings and provided on opposite edges with rack teeth, pinions mounted within the head in mesh with the rack teeth, a tubular shaft rotatably mounted in the bore of the head and provided with clutch teeth at the ends and with an end thrust collar having an adjustable end thrust bearing in one end of the head, an independently rotatable shaft mounted in and extending through the tubular shaft and having a bearing in the other end of the head and clutch teeth at the opposite end, sleeves mounted on the inner shaft and provided with worms meshing with the pinions and having supporting bearings at their peripheries in the head, one of the sleeves having clutch teeth at one end engaged with the clutch teeth at the adjacent end of the tubular shaft and the other sleeve being fixed on the inner shaft and having an end thrust bearing at one end in the head, and an end thrust bearing at the opposite end against the other sleeve.

11. In a tapping tool, the combination of a head having a central axial bore and lateral openings into the bore, outwardly and inwardly movable chasers guided in said openings, a reversible rotatable shaft mounted in said bore and geared with the chasers, to actuate the latter during operation of the tapping tool.

12. In a tapping tool, the combination of a head having an axial bore and lateral openings into the bore, radially movable chasers guided in said openings, a reversibly rotatable shaft mounted in the bore of the head and geared with the chasers, a collar mounted on and adjustable lengthwise of the head and formed with internal openings through the side towards the chasers, independently adjustable end facing and counterboring cutters fitted in said openings, clamping screws securing the cutters in said openings, adjusting screws threaded in the collar and engaging the back ends of the cutters, and an adjusting screw connecting the collar with a relatively fixed part of the head.

13. In a tapping tool, the combination of a head provided at one end with a flange and having an axial bore, lateral openings into the bore and flat longitudinal faces on its periphery; radially movable chasers guided in said openings; a reversibly rotatable shaft mounted in the bore of the head and geared with the chasers; a collar splined on said head and formed with internal openings through the side towards the chasers and opposite the flat faces of the head, end finishing cutters fitted in the openings of the collar, screws threaded radially in the collar and adapted to clamp said cutters together against the flat faces on the head; adjusting screws threaded in the collar lengthwise of the head and engaging the back ends of the cutters; and an adjusting screw connecting the collar with the flange parallel with the axis of the head.

14. In a tapping tool, the combination of a head having a central axial bore and radial openings into the bore, radially movable chasers guided in said openings, a rotatable shaft mounted in the bore of the head and geared with the chasers to actuate the latter during the operation of the tapping tool, and anti-friction rollers loosely confined in recesses formed in the back walls of the chaser openings and bearing against the backs of the chasers adjacent the periphery of the head.

15. In a tapping tool, the combination of a head having an axial bore, longitudinally elongated parallel faced radial openings and shouldered cylindrical pinion blocks fitted in the cylindrical openings and forked at their inner ends parallel with the axis of the head; pinions mounted in the forked ends of said blocks; cap screws threaded radially and countersunk in the head and securing the pinion blocks in place therein, chasers guided in said elongated radial openings which are extended into adjacent sides of the pinion blocks, and formed in opposite edges with rack teeth meshing with the pinions; and a reversibly rotatable shaft mounted in the bore of the head coaxial therewith and provided with worms meshing with the pinions.

16. In a tapping tool, the combination of a head provided with a central axial bore and a plurality of equally spaced radially extending openings leading therefrom, chasers movable in the said openings, a tubular shaft rotatably mounted in the said central bore, gear connections between the said tubular shaft and some of the chasers for actuating the latter, a second shaft rotatably mounted in the tubular shaft, and gear connections between said second shaft and others of the chasers, for actuating the latter.

17. In a tapping tool, the combination of a head provided with a central axial bore and radially extending openings leading therefrom, such openings being disposed in the head in axially spaced circumferential series, sets of chasers movable in each series of openings, shafts rotatably mounted in the central bore of the head, and gearing between each shaft and a set of the chasers for actuating the said sets independently of each other.

18. In a tapping tool, the combination of a head provided with a central axial bore and radially extending openings leading therefrom, such openings being disposed in the head in axially spaced circumferential series, sets of chasers movable in each series of openings, a tubular shaft rotatably mounted in the said central bore, gear connections between the said shaft and one set of chasers, a second shaft rotatably mounted in the tubular shaft, and gear connections between said second shaft and the other set of chasers, the said shafts and gear connections actuating the respective sets of chasers.

19. In a tapping tool, the combination of a head provided with a central axial bore and radially extending openings leading therefrom, thread chasers disposed one in each of such openings, a shaft mounted for rotation in the said central bore, and gear connections between the shaft and the several chasers, whereby upon rotation of the said shaft equalized radial pressures are exerted upon the several chasers.

20. In a tapping tool, the combination of a head provided with a central axial bore and a circumferential row of radially extending openings leading therefrom, thread chasers disposed one in each of such openings, a shaft mounted for rotation in the said central bore, and gear connections between the shaft and the several chasers, whereby upon rotation of the said shaft equalized radial pressures are exerted upon the several chasers.

In witness whereof I hereto affix my signature.

CHARLES P. WETMORE.